W. YATES.
HINGE.
APPLICATION FILED MAR. 13, 1916.
1,185,157.
Patented May 30, 1916.
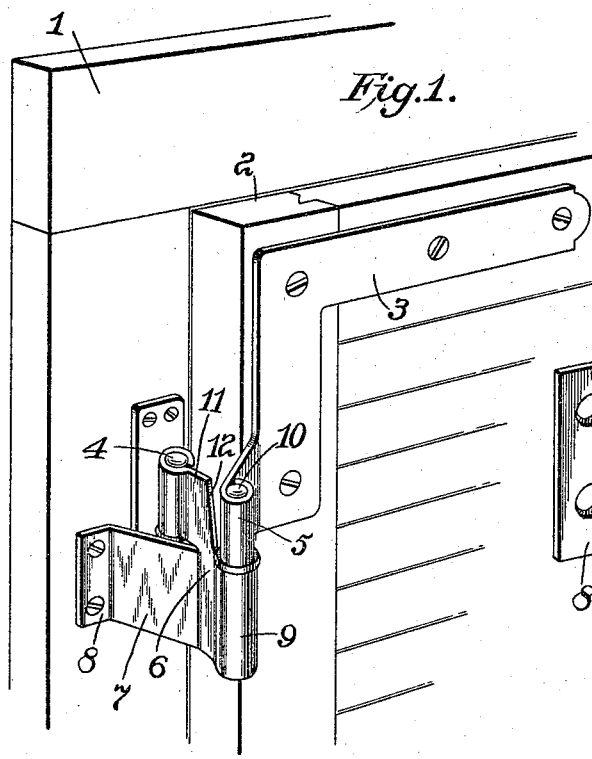
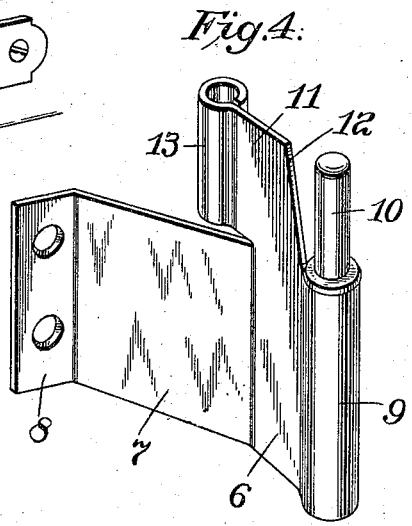
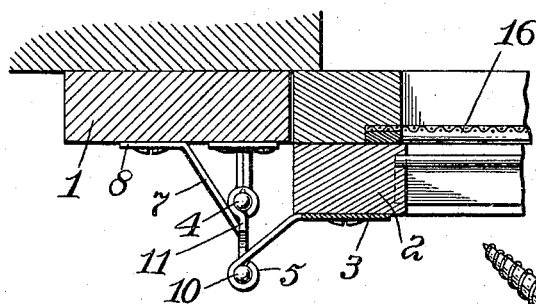
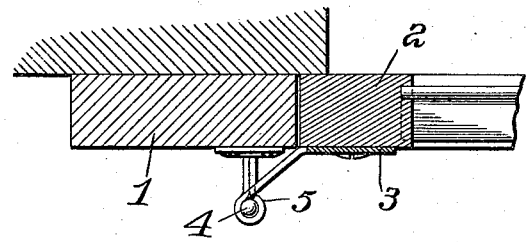
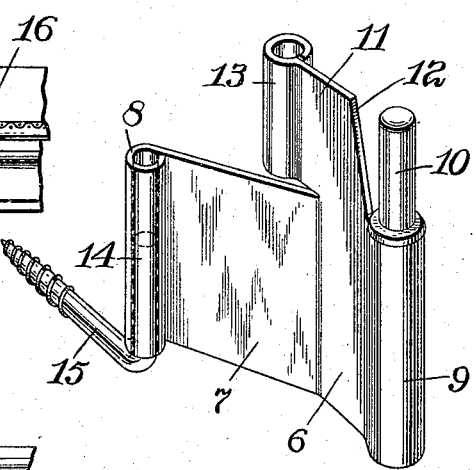
Inventor:
William Yates,
by Parker Cook
Atty.

UNITED STATES PATENT OFFICE.

WILLIAM YATES, OF GLEN ROCK, NEW JERSEY.

HINGE.

1,185,157.  Specification of Letters Patent.  Patented May 30, 1916.

Application filed March 13, 1916. Serial No. 83,862.

*To all whom it may concern:*

Be it known that I, WILLIAM YATES, a citizen of the United States, residing at Glen Rock, in the county of Bergen and State of New Jersey, have invented certain new and useful Improvements in Hinges, of which the following is a specification.

My invention relates to a new and useful improvement in hinges and more particularly to an improvement on a hinge somewhat similar to the hinge patented by me November 4th, 1913, and bearing Patent No. 1,077,447.

The invention relates generally in this instance as in the former instance to a hinge that will permit the use of shutters or blinds with a casing wherein there is a screen that extends from the top to the bottom thereof, the shutter being positioned outside of the casing when the screen is in place and the improved hinge in use, and the shutter capable of being removed and secured to the ordinary pintle and swung within the casing when the screen is removed, as is ordinarily the case with the shutters now in use.

With the hinge shown in my former patent above referred to, it was necessary to remove the ordinary hinge from the shutter and secure the hinge shown in the patent to the shutter.

With my improved hinge as shown in the drawings, afterward to be referred to, it is not necessary to remove the hinge ordinarily used on the shutter when desired to keep the screen in place and still have the shutter attached it being only necessary to slip my improved hinge over the ordinary pintle and to slip the tongue member in the knuckle of the hinge furnished with the shutter. On the other hand when it is desired to remove the screens and have the shutter swing within the casing, it is only necessary to remove the shutter from my improved hinge, remove the improved hinge and place the shutter with the ordinary hinge over the pintle fastened to the casing.

An object therefore of my invention is to produce a hinge that may be readily placed on the ordinary pintle and used with the ordinary form of hinge, so that the shutter may be used on the outside of the casing and the said hinge may be readily removed and the shutter placed back on the pintle performing in its ordinary way.

Still another object of my invention is to provide a hinge that will be exceedingly cheap to manufacture, easy to construct and neat in appearance.

With these and other objects in view my invention consists in certain new and novel constructions and combination of parts as will be hereinafter more fully described and pointed out in the claims.

Referring now to the drawings forming a part thereof and embodying a preferred form and one modified form, Figure 1 is a perspective view showing a part of the casing and my improved hinge in place. Fig. 2 is a horizontal sectional view showing my improved hinge in place and the screen within the casing. Fig. 3 is a horizontal sectional view showing the screen removed and the improved hinge removed, and the shutter swung within the casing. Fig. 4 is a perspective view of the preferred form of the improved hinge and Fig. 5 is a perspective view of a slightly modified form.

In the drawings there is shown a part of a casing 1, and a shutter 2 with the ordinary strap hinge member 3 at the top thereof. It will be understood of course that the shutter is fastened at the bottom similarly to the top, and that two of my improved hinges are of course used with every shutter. The ordinary form of pintle 4 is secured to the side of the casing, and the knuckle 5 of the ordinary strap hinge 3 fits over the tongue of the pintle 4. In other words the invention is to be applied to the shutters now in use without removing the strap hinge or pintle that are in general use with the shutters.

The improved hinge proper consists of what might be termed a body portion 6 and from which extends the portion 7 at an angle thereto, and the portion 8 which also extends at an angle to the portion 7. The angles of the body portions 6, 7 and 8 are such that when the portion 8 is secured to the casing, the portion 6 will be at right angles to the casing and nearly at right angles to the portion 8.

Formed at one edge of the body portion 6 is the bent portion 9 which tightly encircles and grips a tongue member 10, the size of which is such that it fits the knuckle in the ordinary strap hinges now in use on shutters, that is about three-eighths ($\frac{3}{8}$) of a inch in diameter.

Extending up from the body portion 6 and formed integrally therewith is the portion 11 which is cut away as at 12, so that the knuckle of the strap hinge will not bind or contact therewith, and formed at the opposite side of this portion 11 is a knuckle 13 which is large enough in diameter to fit on the ordinary pintle, as now used in connection with shutters. This knuckle is formed directly in back of the pintle 10, or in other words would be in a straight line drawn from the casing to the pintle 10.

As shown in Fig. 5 in the modified form the portion 8 instead of extending at an angle to the portion 7 and being adapted to be secured to the casing is in this instance bent to form a knuckle 14, so that the same may pass over a hook 15.

The operation of the device is therefore as follows: Taking up first the preferred form we will assume that the shutter is in place in the casing as shown in Fig. 3, and that the ordinary form of strap hinge and pintle are in use. The shutter is swung out from the casing and lifted off of the pintle 4. My improved hinge is then placed so that the knuckle 13 fits over the pintle 4. The portion 8 is then secured to the casing, and this procedure of course is duplicated at the lower part of the window and casing. The knuckle 5 of the strap hinge 3 is then placed over the pintle 10 of the improved hinge. The screen 16 is then placed within the casing and the shutter is swung back against the casing and the inner portion of the shutter will be flush with the outer portion of the screen and casing, as shown in Figs. 1 and 2. If the modified form is used instead of securing the portion 8 to the casing the hook 15 will be placed on the side of the casing and the knuckle 14 slipped over the hook 15. The shutter may now be swung back or closed without in any way interfering with the screen. If desired to remove the screen, it is only necessary to lift the shutter so that the knuckle 5 slips off the pintle 10, and if the preferred form is used the portion 8 unscrewed from the casing, or if the modified form is used the entire hinge is simply slipped from the pin 15 and the pintle 4 and the shutter then placed back on the pintle 4, that is the knuckle 5 of the ordinary hinge over the pintle 4.

From the foregoing it will be seen that with my hinge as shown the ordinary strap hinge and pintle now generally in use with shutters may be used and without in any way unfastening them from the shutter or casing, and improved hinge may be readily slipped on the tongue of the ordinary pintle 4 or may be as readily removed.

Having thus described my invention what I claim as new and desire to secure by Letters Patent is:—

1. A hinge comprising a body portion, a member extending at an angle to the body portion, and a second member extending at an angle to both of said portions, a pintle secured to the opposite edge of the body portion and a knuckle formed on the upper part of said body portion.

2. A hinge formed from a single strip of metal and having a pintle at one edge and a knuckle at its upper portion positioned to the rear of said pintle and means at the opposite edge of said hinge for securing the same to the casing.

In testimony whereof I have affixed my signature.

WILLIAM YATES.

Copies of this patent may be obtained for five cents each, by addressing the "Commissioner of Patents, Washington, D. C."